(12) United States Patent
Ellis

(10) Patent No.: US 6,702,154 B2
(45) Date of Patent: Mar. 9, 2004

(54) DISPENSER

(75) Inventor: M. Jeffrey Ellis, Spring Valley, NY (US)

(73) Assignee: Rand Display, Inc., Teaneck, NJ (US)

( * ) Notice: Subject to any disclaimer, the term of this patent is extended or adjusted under 35 U.S.C. 154(b) by 19 days.

(21) Appl. No.: 09/992,288

(22) Filed: Nov. 19, 2001

(65) Prior Publication Data

US 2003/0094465 A1 May 22, 2003

(51) Int. Cl.[7] ................................ B65D 5/06
(52) U.S. Cl. ........................ 222/185.1; 222/1
(58) Field of Search .............. 222/185.1, 305, 222/363, 425, 1

(56) References Cited

U.S. PATENT DOCUMENTS

| | | | |
|---|---|---|---|
| 716,507 A | 12/1902 | Williams | |
| 2,070,264 A | 2/1937 | Farnsworth et al. | |
| 2,660,339 A | * 11/1953 | Koob | 222/105 |
| 2,834,513 A | 5/1958 | Schupp | |
| 4,256,237 A | * 3/1981 | Desmond | 221/26 |
| 5,139,173 A | 8/1992 | Evinger | |
| 5,375,744 A | * 12/1994 | Henderson | 222/306 |
| 5,673,817 A | * 10/1997 | Mullen et al. | 222/94 |
| 5,927,558 A | 7/1999 | Bruce | |
| D413,767 S | 9/1999 | Elmore | |
| 6,158,623 A | * 12/2000 | Benavides et al. | 222/129 |
| 6,199,724 B1 | * 3/2001 | Yeranossian | 222/154 |
| 6,510,965 B1 | * 1/2003 | Decottignies et al. | 222/95 |

* cited by examiner

*Primary Examiner*—Gene Mancene
*Assistant Examiner*—Melvin A. Cartagena
(74) *Attorney, Agent, or Firm*—Mark P. Stone

(57) ABSTRACT

A housing for dispensing material, particularly granular material, has a ramp shaped bottom surface inclined towards a front discharge chute. The chute is retained in a compartment which is integrally formed together with the housing. The housing is formed from two substantially identical half sections which are removably joined together, each of the housing half sections including a half section for the retaining compartment for the chute. In its assembled position, the chute has a plate-like gate element, pivotable between closed and opened positions, through actuation of an armature mechanically linked to the gate. The housing sections can be formed from known injection molding processes.

22 Claims, 3 Drawing Sheets

DISPENSER

BACKGROUND OF THE INVENTION

The present invention is directed to an apparatus for dispensing material, and in particular, solid granular material. It is also within the scope of the present invention to provide a dispenser for liquids. The improved apparatus is particularly useful in connection with dispensing coffee beans, but is also equally advantageously useful for dispensing other materials such as powered and granular products, beans, and bulk products such as candy.

U.S. Pat. Nos. 716,507; 2,070,264; 2,834,513; 5,139,173; and 5,927,558 illustrate examples of past and current dispensing devices. U.S. Pat. No. 5,139,173 discloses a bulk product dispenser having a housing designed to dispense material, including coffee, by gravity feed of the material down an inclined bottom surface and through a discharge chute. The housing of the disclosed device is of a unitary construction, rendering it difficult to disassemble the device for repair, maintenance or inspection purposes. The flow of material through the forward chute is controlled by physical movement of the chute itself from a first position in which flow of material is blocked and a second position in which flow of material is permitted.

It is an object of the present invention to provide an improved dispenser and method of manufacturing the same of the general type disclosed by U.S. Pat. No. 5,139,173. In accordance with this objective, the present invention provides a dispenser including a housing and discharge cute which are readily assembled into an operational mode and readily disassembed to permit easy maintenance, replacement and repair. It is a further object of the present invention to provide improved means for controlling the flow of material from the discharge chute.

Other objects and advantages of the present invention will become apparent from the following description in conjunction with the accompanying drawings.

SUMMARY OF THE INVENTION

In accordance with the present invention, a dispenser apparatus includes a housing formed from two substantially identical mirrored half sections which are removably joined together into an assembled configuration. Each half housing section includes a supporting stand and a downwardly inclined bottom surface. Each housing section also includes a half section of a compartment for retaining a chute at the front lower portion of the assembled housing. Each half section of the chute retaining compartment is integrally formed together with one of the half housing sections such that when the two housing sections are joined together in an assembled configuration, a lower forward compartment for retaining a chute is defined at the front lower portion of the assembled housing. A removable cover is mountable to the opened top of the assembled housing to provide access to the inside of the housing to add additional material therein as needed.

In operation, a chute is mounted in the chute retaining compartment defined at the lower forward end of the assembled housing. The chute includes a plate-like movable gate element which is spring biased into a closed position to block a discharge chute opening. In this position, material which would otherwise slide down the inclined bottom surface of the housing and through the forward discharge opening of the chute, is blocked by the closed gate. An armature mounted to the outer surface of the assembled housing is mechanically linked to the gate such that actuation of the armature moves the gate against the spring bias and into an opened position in which the discharge chute opening is no longer blocked by the gate. In this position, material within the housing will flow down the inclined bottom surface of the housing as a result of gravity feed, and will be discharged from the housing through the opened discharge chute.

Preferably, the chute is removably mounted in the chute retaining compartment to facilitate repair, inspection and replacement of the chute. However, when the chute is mounted to the housing in its assembed position, the chute remains substantially fixed in position and is not movable relative to the assembled housing.

The apparatus in accordance with the present invention can readily be manufactured in half sections by known molding procedures including injection molding. In this manner, the production costs of the device are reduced. The components of the dispenser are easily assembled together either at the manufacturing facility, or at the user on site location, and can be readily disassembed for repair, maintenance and inspection. Accordingly, the different components of the dispenser, as for example, the chute, replaced as needed without replacing the entire dispenser apparatus.

In the preferred embodiment of the invention, the components of the dispenser are formed from plastic, and are produced by injection molding procedures.

DESCRIPTION OF THE BEST MODES FOR CARRYING OUT THE INVENTION

Figure 1:
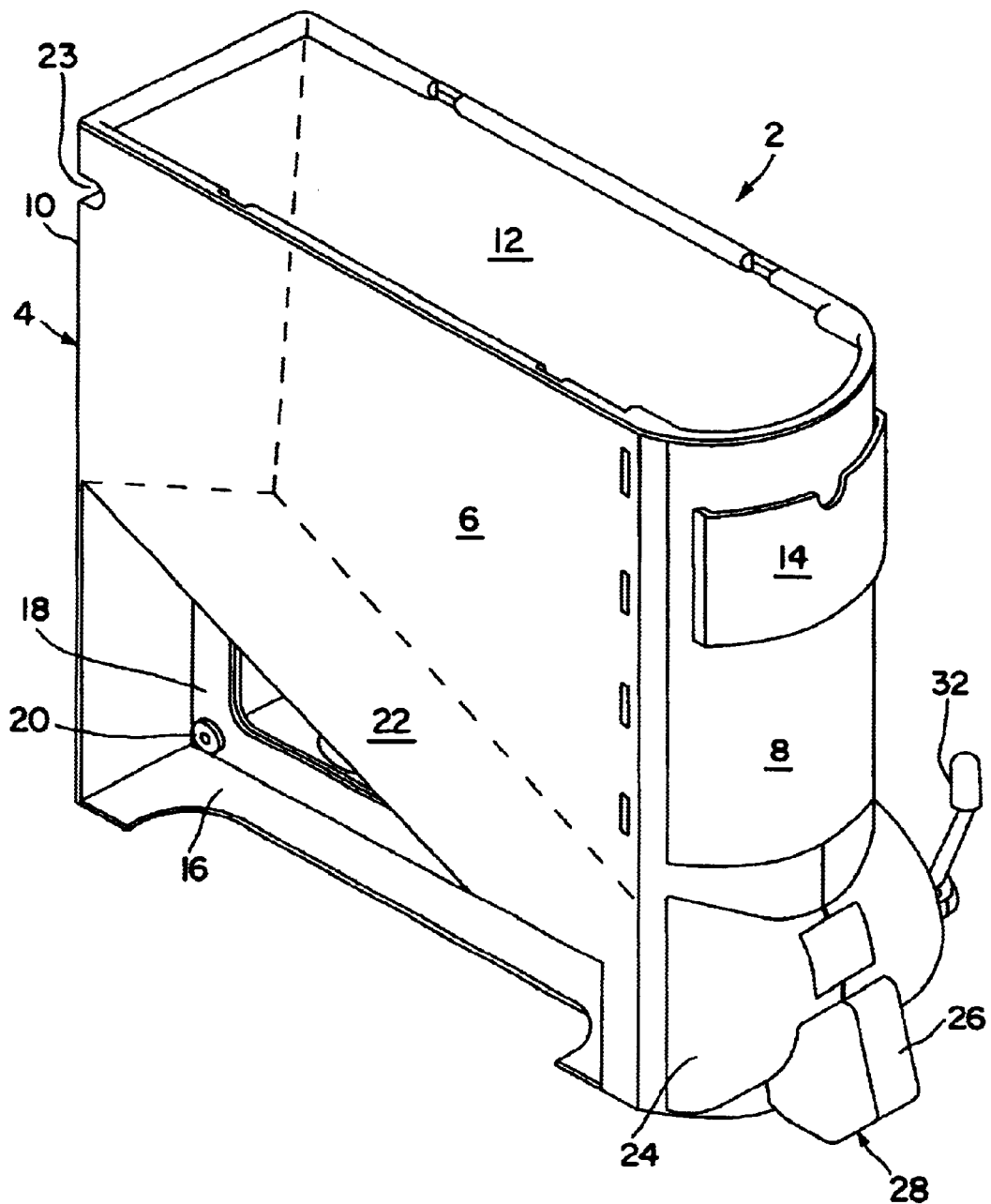
FIG. 1 is a perspective view of an assembed dispenser in accordance with the present invention.
Figure 2:
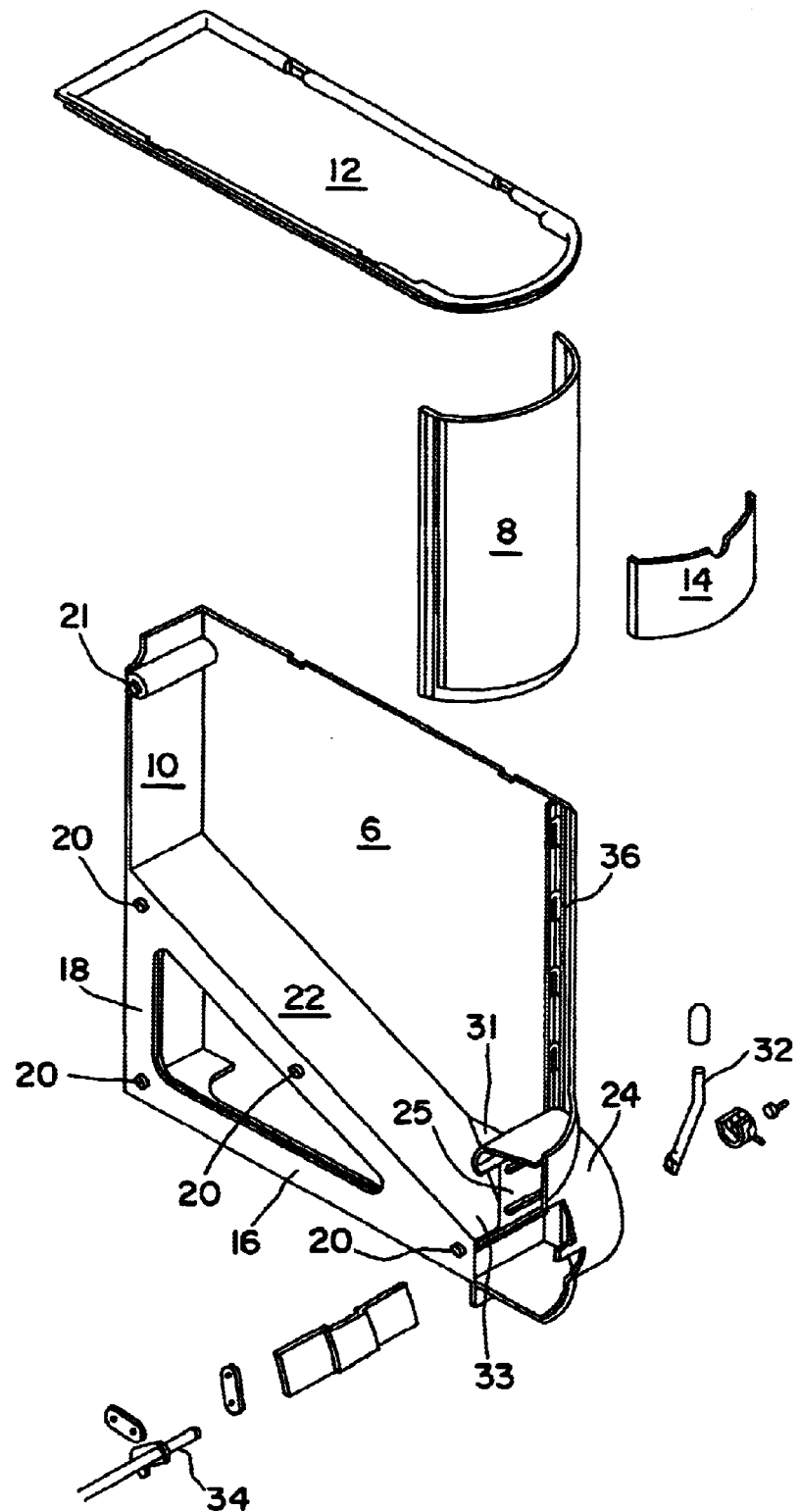
FIG. 2 is an exploded view of a right half section of the dispenser illustrated by FIG. 1.
Figure 3:
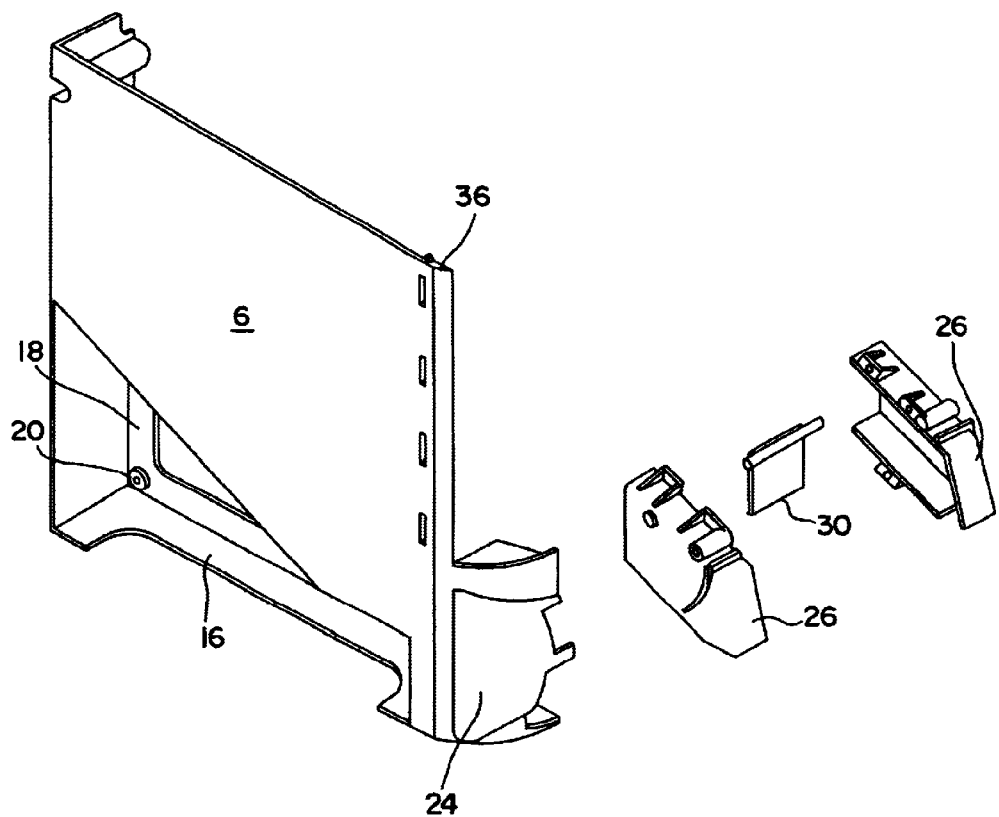
FIG. 3 is an exploded view of a left half section of the dispenser illustrated by FIG. 1.

FIGS. 1–3 illustrate the preferred embodiment of a dispenser in accordance with the present invention.

Referring first to FIG. 1, the assembled dispenser is designated generally by reference numeral 2. It includes a housing generally designated by reference numeral 4 which is defined by two opposed sidewalls 6 (only one of which is shown in FIG. 1), a front wall generally designated by reference numeral 8, and a rear wall generally designated by reference numeral 10. A cover 12 is removably mounted to the top of the housing to provide access therein. The cover 12 is selectively removable from the housing to refill the contents thereof with material to be dispensed. The front wall 8 of the housing includes a pocket for receiving and displaying printed information, such as the identification of the material stored within the housing.

The dispenser 2 also includes a stand designated by reference numeral 16 below the housing 4 for supporting the housing. As will be discussed in greater detail below, the assembled dispenser is formed by joining together two half sections. Preferably, the supporting stand 16 is integrally formed with each of two half housing sections of the dispenser which are removably joined together to form the assembled dispenser. As best illustrated by FIGS. 1 and 2, the supporting stand for each half section of the dispenser defines a mounting flange 18 having one or more openings 20 for removably joining the two dispenser half sections together in the assembled configuration illustrated by FIG. 1. Each half section also defines a mounting opening 21 (see FIG. 2) defined in a notch 23 (see FIG. 1) for removably joining together the upper portions of each half section.

FIGS. 1–3 illustrate that the bottom wall of the housing 6, which is defined by the upper surface of the supporting element 16, is a downwardly inclined ramp designated by reference numeral 22. The ramp is inclined in a direction from the rear wall 10 towards the front wall 8 to permit downward and forward flow of material within the housing towards the front wall by gravity feed. In the preferred embodiment of the invention, the angle of inclination of the ramp 22 is approximately 30° relative to the supporting stand 16, and the surface of the ramp is a smooth, polished material, preferably plastic, to permit material to flow down the ramp.

Referring to FIG. 1, the assembled dispenser 2 defines a lower compartment 24 extending forwardly of the front wall 8. The assembled compartment 24 is formed from two half sections, each of which are integrally formed with one half section of the overall dispenser 2, as best illustrated by FIGS. 2 and 3. The compartment 24 is provided to receive a forward discharge chute 26 which is removably mounted to the compartment 24. The chute 26 itself can be formed from two half sections joined together as illustrated by FIG. 3. The chute 26 defines a lower discharge opening 28 to permit material within the housing 4 to be discharged therefrom. A gate or door designated by reference numeral 30 is movably mounted within the chute 26 and spring biased into a position in which it blocks the discharge opening 28. The downwardly inclined bottom wall 22 of the housing causes material within the housing to flow towards the chute 26 as a result of gravity feed. However, when the gate 30 is in its closed position, it blocks the discharge opening 28, thereby preventing material within the housing from being discharged through the chute 26.

Each half section of the compartment 24 has a rear wall 25, and the rear walls are arranged to define a space therebetween when the two half sections are assembled. As seen in FIG. 2, the walls 25 are disposed at the forward, lowermost end of the ramp 22 when the dispenser is assembled. The assembled chute 26 is mounted in the space defined between the two wall sections 25. As illustrated in FIG. 2, the wall sections 25 are oriented substantially perpendicular to the supporting stand 16. It is also within the scope of the present invention to orient the wall sections 25 at an angle other than perpendicular to the supporting stand 16, preferably inclined in a direction forwardly of the ramp 22 and at an angle of approximately 70° relative to the supporting stand 16.

An armature 32, mounted to the right side of the assembled dispenser illustrated by FIG. 1, is mechanically linked to the gate 30 by linkage generally illustrated by reference numeral 34 in FIG. 2. In its relaxed position, the armature is oriented upright and the gate 30 is spring biased into its closed position completely blocking the discharge opening 28 of the chute 26 and preventing the flow of any material therethrough. However, when the armature 32 is moved or pivoted in a predetermined direction, (e.g., in a forward direction relative to the assembled dispenser 2), a mechanical force is applied to the gate 30, overcoming the spring bias, causing the gate 30 to move or pivot into an opened position in which the discharge opening 28 of the chute 26 is no longer completely blocked. In this position, material within the housing will flow down the ramp 22 and into the chute 26 as a result of gravity feed, to be discharged from the dispenser through the discharge opening 28. When the mechanical force applied to the armature 32 is released, the spring bias on the gate 30 will return the gate to its closed position completely blocking the discharge opening 28, and will also return the armature 32 to its upright position as a result of the mechanical linkage 34 between the gate and the armature. Accordingly, the quantity of material discharged from the dispenser is controlled by the selective actuation of the armature. Additionally, the rate of flow of material discharged from the dispenser is selectively controllable by the position of the armature which is movable between a first position in which the discharge opening 28 of the chute 26 is completely blocked by the gate 30 to prevent discharge of any material, and a second fully opened position in which no portion of the gate 30 blocks any portion of the discharge opening to permit maximum discharge of material from the dispenser. The armature 32 may also be moved into intermediate positions in which the discharge opening 28 is only partially blocked by the door 30 to permit an intermediate flow rate of material as it is discharged from the dispenser. Preferably, the gate is pivotably mounted over the discharge opening in the chute. However, it may also be mounted for other types of movement, as for example, slideable movement.

In the preferred embodiment of the invention, the bottom wall 22 of each half section of the housing has a raised shoulder portion, designated by reference numeral 31 in FIG. 2, at the forward end of the outer side of the bottom wall. The raised shoulder portions on both the right and left half sections of the housing converge and slope downwardly towards a center region, designated by reference numeral 33 in FIG. 2, of the bottom wall 22. The central region 33 is in alignment with the chute 26 so that the shoulders 31 direct and channel the flow of material down the bottom wall 22 and into the chute 26.

In accordance with the present invention, the right half section of the dispenser as illustrated by FIG. 2 is separately formed from the left half section of the dispenser as illustrated by FIG. 3. The two half sections are then removably joined together to form the assembled dispenser as illustrated in FIG. 1. Preferably, the half sections are removably joined together by screws passing through the aligned openings 20 defined in the respective mounting flanges 18 of each of the half sections, and through the upper mounting openings 21.

The assembled dispenser as illustrated by FIG. 1 can be readily disassembed into its separate components for repair, maintenance and inspection. This is accomplished by removing the mounting screws from the openings 20 in the mounting flanges 18 of the respective dispenser half sections, removing the mounting screws from the mounting openings 21, and removing the removable cover 12. Additionally, in the preferred embodiment of the invention, the front wall 8 is removably mounted to the front of the assembled dispenser above the lower compartment 24 by sliding the opposed sides of the front wall 8 into mounting channels 36 defined on the forward inner ends of the sidewalls 6 of of the respective dispenser half sections. Preferably, the front wall is formed from a transparent plastic material to permit visual observation of the contents within the dispenser, and the front wall can be removed from the dispenser for cleaning as may be necessary.

Once the two dispenser half sections are separated from each other and the front wall 8 and cover 12 are removed, the chute 26 is removable from the separated chute retaining compartment 24. The chute 26 can then be disassembled into its separate components including the two chute half sections 26 and the pivotable gate 30 as illustrated by FIG. 3.

It becomes apparent from the above discussion that the dispenser in accordance with the present invention can be readily disassembled into its basic components to facilitate maintenance, inspection and repair as may be required during the operating life of the device. Moreover, individual components of the dispenser can be replaced or repaired without replacement of the entire dispenser.

Preferably, the individual components of the dispenser, and in particular the two dispenser half sections, are formed from a durable plastic material by conventional molding processes such as injection molding. In this manner, the dispenser can be inexpensively mass produced.

The dispenser in accordance with the present invention is useful for dispensing solid material, particularly granular or powdered materials, beans, or bulk products such as candy. It is also within the scope of the present invention to utilize the dispenser disclosed herein to dispense liquid materials or semi-solid materials such as gels. When employing the dispenser for liquid or semi-liquid or semi-solid material, the dispenser half sections will be tightly sealed together in the assembled configuration of the device, and the gate will tightly seal the chute discharge opening in the closed position of the gate.

Other modifications and advantages of the apparatus and methods within the scope of the present invention will become apparent to those skilled in the art. Accordingly, the description of the preferred embodiments of the apparatus and methods of the present invention are intended to be illustrative only, and not restrictive of the scope of the invention, that scope being defined by the following claims and all equivalents thereto.

What is claimed is:

1. A dispenser comprising a housing for holding a product to be dispensed, said housing having a bottom wall sloped in a direction towards a discharge outlet, said housing comprising two housing half sections and means for removably joining said housing half sections together, said dispenser further comprising a discharge chute defining said discharge outlet; said housing defining a compartment for retaining said discharge chute; said compartment comprising two half sections, each said half section of said compartment being integrally formed with a different one of said housing half sections.

2. The dispenser as claimed in claim 1 further comprising a supporting stand for said housing, said supporting stand comprising two half sections removably joined together, each said half section of said supporting stand being integrally formed with a different one of said housing half sections.

3. The dispenser as claimed in claim 1 wherein said housing comprises a removable front wall, and means for selectively removing said front wall from said housing.

4. The dispenser as claimed in claim 3 wherein said removable front wall is formed, at least in part, from a transparent material.

5. The dispenser as claimed in claim 3 wherein said housing includes two opposed sidewalls, and said means for removing said front wall comprises at least one channel defined in each of said opposed sidewalls for removably receiving therein opposed sides of said removable front wall.

6. The dispenser as claimed in claim 5 wherein said said housing includes a removable top cover.

7. The dispenser as claimed in claim 1 wherein said discharge chute comprises two chute half sections removably joined together.

8. The dispenser as claimed in claim 1 further including a gate movably mounted over said discharge outlet in said chute, and means for selectively moving said gate between a closed position in which said gate completely blocks said discharge outlet and an opened position in which said gate is positioned relative to said discharge outlet to permit flow of product therethrough.

9. The dispenser as claimed in claim 8 wherein said gate is resiliently biased in said closed position, and said means for selectively moving said gate includes an armature mounted to an outer surface of said dispenser and means for mechanically coupling said armature to said gate.

10. The dispenser as claimed in claim 9 wherein said gate is pivotably mounted in said chute.

11. The dispenser as claimed in claim 1 wherein said compartment defines a wall adjacent to said discharge chute, said wall being oriented substantially perpendicular to a horizontal surface on which said dispenser is supported.

12. The dispenser as claimed in claim 1 wherein said compartment defines a wall adjacent to said discharge chute, said wall being oriented at an angle other than perpendicular relative to a horizontal surface on which said dispenser is supported.

13. A dispenser comprising a housing for holding a product to be dispensed, said housing having a bottom wall sloped in a direction towards a discharge outlet, said housing comprising two housing half sections and means for removably joining said housing half sections together, said dispenser further comprising a supporting stand for said housing, said supporting stand comprising two half sections removably joined together, each said half section of said supporting stand being integrally formed with a different one of said housing half sections.

14. The dispenser as claimed in claim 13 wherein said means for removably joining comprises a flange on each half section of said supporting stand, each said flange defining at least one opening therein, said openings on said flanges being oriented such that said openings are in alignment when said two housing half sections are joined together.

15. The dispenser as claimed in claim 13 wherein said housing comprises a removable front wall, and means for selectively removing said front wall from said housing.

16. The dispenser as claimed in claim 15 wherein said removable front wall is formed, at least in part, from a transparent material.

17. A method of fabricating a dispenser, said method comprising the steps of:

fabricating two half sections of a housing for holding product to be dispensed, removably joining said two half sections to form an assembled dispenser, and fabricating two half sections of a compartment for retaining a discharge chute, each said half section of said compartment being fabricated integrally with a different one of said half sections of said housing.

18. The method as claimed in claim 17 further including the step of:

fabricating a half section of a supporting stand integrally with each said half section of said housing.

19. The method of fabricating a dispenser as claimed in claim 1, said method comprising the steps of:

wherein said step of fabricating said two half sections of said housing includes the step of fabricating said two half sections of said housing by injection molding.

20. A method of fabricating a dispenser, said method comprising the steps of:

fabricating two half sections of a housing for holding product to be dispensed, removably joining said two half sections to form an assembled dispenser, and fabricating a half section of a supporting stand integrally with each said half section of said housing.

21. The method as claimed in claim 20 further including the step of fabricating mounting means for joining together said two half housing sections of said housing integrally with each half section of said supporting stand.

22. The method as claimed in claim 21 wherein said mounting means comprises a flange on each half section of said supporting stand.

* * * * *

UNITED STATES PATENT AND TRADEMARK OFFICE
CERTIFICATE OF CORRECTION

PATENT NO. : 6,702,154 B2
DATED : March 9, 2004
INVENTOR(S) : M. Jeffrey Ellis

It is certified that error appears in the above-identified patent and that said Letters Patent is hereby corrected as shown below:

<u>Column 8,</u>
Line 2, delete "claim 1", and substitute -- claim 17 --.

Signed and Sealed this

Fourth Day of May, 2004

JON W. DUDAS
*Acting Director of the United States Patent and Trademark Office*